Figure 16:
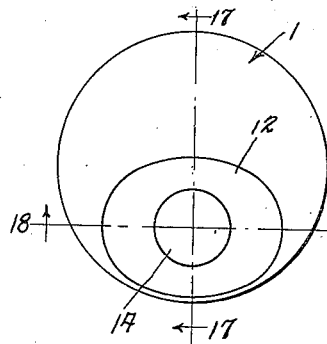

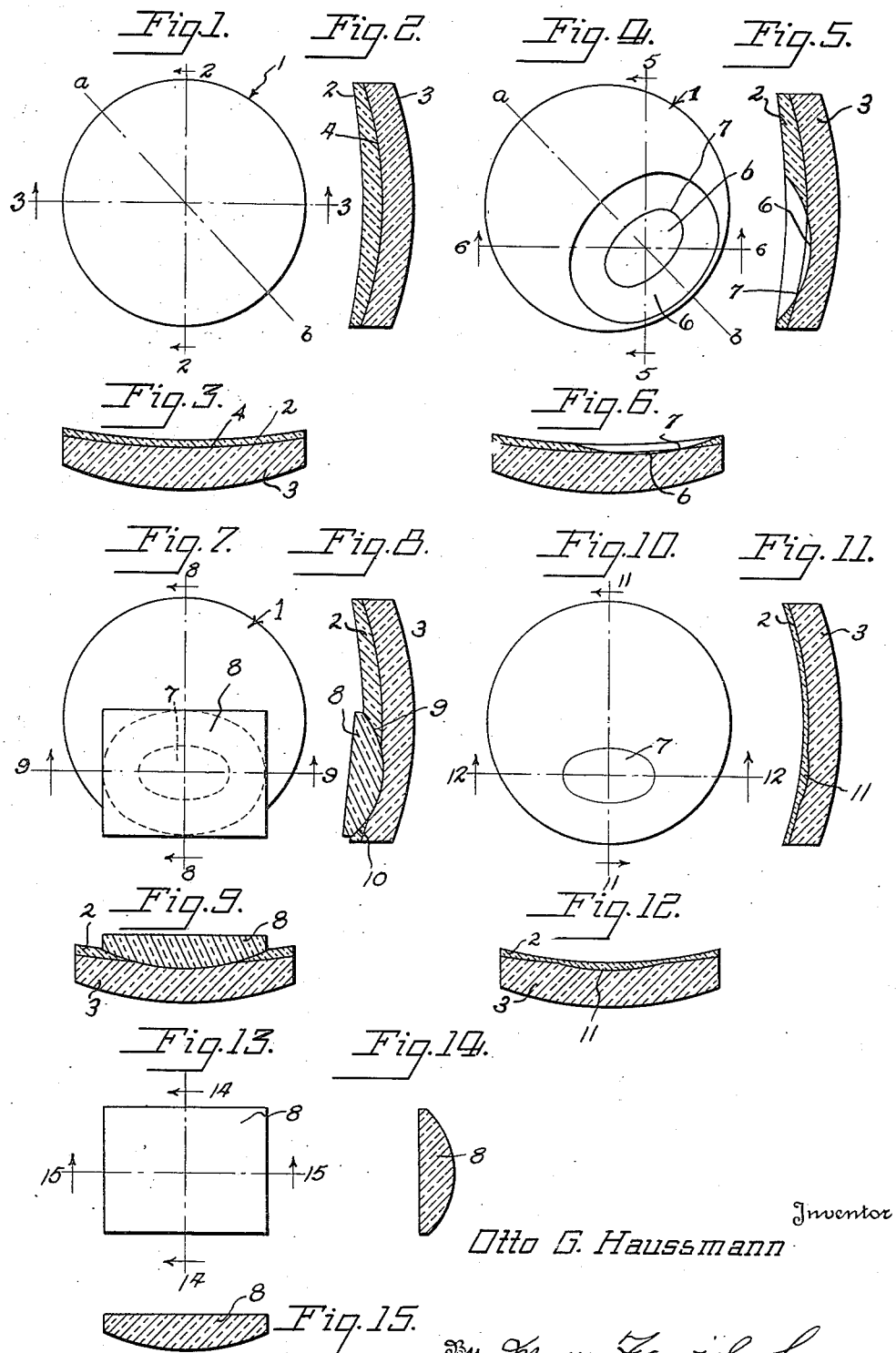
Sept. 1, 1936. O. G. HAUSSMANN 2,052,825
OPHTHALMIC LENS WITH ELLIPTIC SEGMENT
Filed Sept. 8, 1934 2 Sheets-Sheet 1
Inventor
Otto G. Haussmann
By Mason Fenwick & Lawrence
Attorneys Sept. 1, 1936.　　　　O. G. HAUSSMANN　　　　2,052,825
OPHTHALMIC LENS WITH ELLIPTIC SEGMENT
Filed Sept. 8, 1934　　　　2 Sheets-Sheet 2

Inventor
Otto G. Haussmann

By Mason Fenwick & Lawrence
Attorneys

Patented Sept. 1, 1936

2,052,825

UNITED STATES PATENT OFFICE 2,052,825

OPHTHALMIC LENS WITH ELLIPTIC SEGMENT

Otto G. Haussmann, Philadelphia, Pa.

Application September 8, 1934, Serial No. 743,297

11 Claims. (Cl. 88—54)

This invention relates to that class of ophthalmic lenses known as fused bi-focal and multi-focal lenses.

It has long been apparent to those engaged in the art of fitting glasses that if a bi-focal in which that portion of the lens used for seeing objects distinctly at close range, generally termed the segment, is made so as to have a long horizontal diameter and a short vertical diameter, such lens is an improvement over the ordinary bi-focal with circular or semi-circular segment. Not only does a bi-focal made with a narrow segment give the eye more ease and comfort, but it reduces materially the annoying doubling of images when looking downward, especially when walking down stairs.

Bi-focal lenses have been from time to time invented for which these advantages have been claimed. None, however, are made with segments having a long elliptical outline, nor are there any of these lenses made so that the edge or dividing line between the segment and the crown glass does not appear on either surface of the finished lens but is encased between the two surfaces.

It is a well known fact in geometric optics that when a sphere intersects a cylinder, the resultant surface will always be elliptical in shape, unless the intersection is perpendicular to the axis of the cylinder, and when two cylindrical surfaces intersect each other, the resultant surface will also be elliptical in shape unless the intersection is parallel to their axes or at right angles. In the latter case, only when the two cylinders are of the same curvature, will the resultant surface be circular in shape.

This principle of intersecting curves forms the basis of my invention. I do not, however, limit myself to the principle of intersecting a cylindrical with a spherical surface, but in my invention the elliptical form of the segment may be arrived at by intersecting two cylindrical surfaces which may or may not be of the same curvature. This method is new and is not believed to have been practiced heretofore in the art of making bi-focal or multi-focal lenses having varying refractive powers.

In geometric optics, these surfaces are known as "toric" surfaces. The ophthalmic lens of my invention consists, therefore, of a series of spherical, cylindrical or toric surfaces intersecting in such a way as to make the resulting segment elliptical in shape. These curves can be so calculated that the ratio between the long and short diameter of the segment may be definitely determined beforehand, producing a segment of any desired elliptical shape or relative dimensions, and the angle of intersection can be so calculated that the resultant refractory power of the upper and lower portion of the blank, when finished, is free from any cylindrical element, resulting in an ophthalmic lens blank with two or more focal powers, free from any cylindrical distortion.

From the above, it will be understood that among the objects of my invention are:

The provision of a bi-focal and multi-focal lens having a segment of long elliptical outline;

To construct the elliptical depression for the segment button by intersecting two surfaces, one or both of which are of elliptic or toric contour;

The provision of a bi- or multi-focal lens in which the segment does not form part of either of the surfaces of the lens.

Other objects of the invention will appear from the description of several embodiments of the inventive principle.

Figure 17:
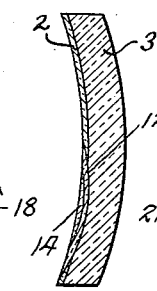
Figure 19:
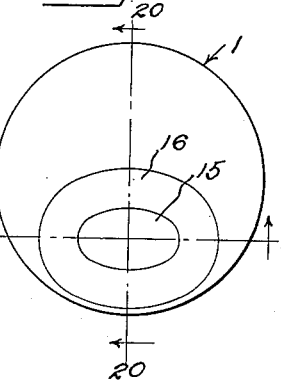
Figure 20:
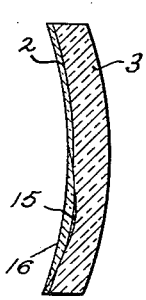
Figure 18:
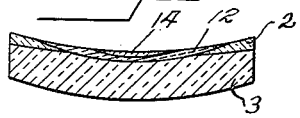
Figure 21:
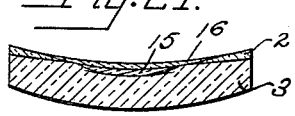
Figure 22:
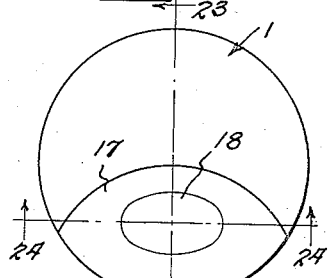
Figures 23, 25, 26:
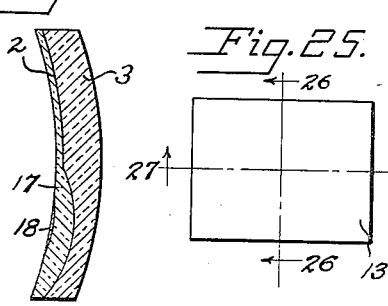
Figure 27:
Figure 28:
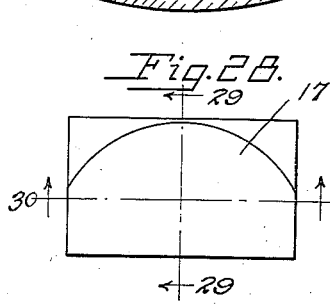
Figure 29:
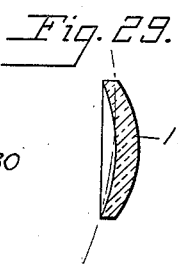
Figure 30:
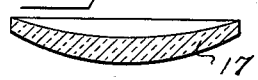

In the drawings which accompany and form a part of the following specification and throughout the several figures of which the same characters of reference have been employed to designate identical parts:

Figures 1, 2 and 3 represent a front elevation, and sectional views taken respectively along the lines 2—2 and 3—3 of Figure 1;

Figures 4, 5 and 6 are a plan view, and sections taken respectively along the lines 5—5 and 6—6 of Figure 4;

Figures 7, 8 and 9 are a front elevation, and sectional views taken respectively along the lines 8—8 and 9—9 of Figure 7;

Figures 10, 11 and 12 are a front elevation, and sectional views taken respectively along the lines 11—11 and 12—12 of Figure 10;

Figures 13, 14 and 15 are a front elevation, and sectional views taken respectively along the lines 14—14 and 15—15 of Figure 13, showing the button employed in Figures 7, 8 and 9;

Figures 16, 17 and 18 are a front elevation, and sectional views taken respectively along the lines 17—17 and 18—18 of Figure 16, illustrating a tri-focal lens;

Figures 19, 20 and 21 are a front elevation, and sectional views taken respectively along the lines 20—20 and 21—21 of Figure 19;

Figures 22, 23 and 24 are a front elevation, and sectional views taken respectively along the lines 23—23 and 24—24 of Figure 22;

Figures 25, 26 and 27 are a front elevation, and sectional views taken respectively along the lines 26—26 and 27—27 of Figure 25, illustrating the button employed in making the lens shown in Figure 16; and Figures 28, 29 and 30 are a front elevation, and sectional views taken respectively along the lines 29—29 and 30—30 of Figure 28, showing the button employed in making the lens shown in Figure 22.

Referring now in detail to the several figures and first adverting to that form of the invention embraced in the group of Figures 1 to 15 which illustrate stages in the manufacture of the lens, the numeral 1 represents, in general, a basic blank composed of two elements of glass 2 and 3 of any desired thickness, but differing in their refractive indices and fused together. The necessity for using two component elements for the basic blank will become apparent as the description proceeds. In order that the softer glass may be protected insofar as possible from becoming scratched, it is customarily placed on the concave side of the blank where only the edges will ever inadvertently come in contact with an extraneous object capable of scratching it. In Figure 2, therefore, the element 2 is of flint glass while the element 3 is of harder crown glass. Glass of higher refractive power is usually, but not necessarily, made of flint glass since other glasses of relatively high refractive index are known and may be employed. However, for convenience, the term "flint" glass is used throughout this specification to denote the glass of higher refractive index. In Figures 2 and 3, the flint glass element is convex, while the crown glass element is of corresponding concave cylindrical curvature, the cylindrical faces of the two elements contacting and being fused together.

The arrangement of the glass elements of the basic blank may be reversed without affecting the invention.

The basic blank 1, constituted as is indicated in Figures 2 and 3, is next made ready for grinding. A concave toric depression 6 either parallel to or obliquely intersecting the axis $a$, $b$, Figure 4, is ground into the lower portion of the basic blank. In Figure 4, the cylindrical axis of the toric depression is parallel to the line 6—6 and therefore at an angle of 45 degrees to the axis $a$, $b$. The depression 6 is cut both through the flint and into the crown glass, the small elliptical outline 7 representing the edge of the common surface of the crown and flint elements intersected by the said depression. The curvature and major axis of this toric depression is calculated so as to give the desired addition to the upper or distant portion of the finished blank. The depression is ground and polished on toric laps by any of the various methods employed in optical shops.

Into the toric depression 6, a flint glass button 8, Figure 8, is fused having an opposite curvature, (toric convex) completely filling the depression. The flint button 8 is of the same refractive index as the flint element 2 of the basic lens, consequently, in fusing, the lines 9 and 10, Figure 8, disappear and the entire back surface of the lens becomes one homogeneous layer of flint glass. The lens is constituted by that portion 11 of the flint button, Figure 11, which fills that part of the depression within the outline 7.

If a lighter flint button is used, than the flint element of the basic lens, the result will be a tri-focal having a strong addition for the smaller elliptical segment represented by the outline 7 and a slightly weaker addition constituted by the larger elliptical segment.

Now, referring to Figures 16 to 18 and Figures 25 to 27, inclusive, the button 12 which is fused into the basic blank consists of a lighter flint glass than the flint of the basic blank. Into this button is ground a spherical depression 13 and a small spherical heavy flint button 14 inserted. It is immaterial whether the two flints are fused separately or the entire fusing of the four contacting surfaces done in one operation.

Figures 19, 20 and 21 show a modification of that form of the invention illustrated in Figures 1 to 15 inclusive, the button being of lighter flint glass than the flint element of the basic lens. This results in a tri-focal having a strong addition 15 for the smaller elliptical segment and a larger elliptical segment 16 of slightly weaker addition.

Referring now to Figures 22, 23 and 24, a further modification of the invention is disclosed in which the flint button 17 which is fused into the basic blank is of a lighter index than that of the basic blank and a heavier flint button 18 is fused into a spherical recess ground into the lighter flint button. The blank is then finished on the flint side either on a spherical or toric lap selected to give the proper reading additions and neutralize the cylinder elements. Owing to the difference in the refractive power of the crown and flint glass, the various cylindrical elements in the crown and flint glass neutralize one another producing, provided the curves and angles of intersection between the curves have been accurately calculated, a finished spherical bi-focal or multi-focal blank. The desired correction for distance can then be ground to the crown surface of the blank in the usual manner.

While I have in the above description disclosed what I believe to be practical embodiments of my invention, it will be understood to those skilled in the art that the specific constructions as shown and described are merely illustrative and not to be construed as limiting the scope of the invention as claimed.

What I claim is:

1. Ophthalmic lens blank comprising a basic lens including two layers of glass having different refractive indices and having coinciding concave and convex cylindrical surfaces fused into a common cylindrical section, said lens blank being formed with a cylindrical depression extending through one layer and into the other, intersecting the common cylindrical section in an elliptical outline.

2. Ophthalmic lens comprising a basic lens including two layers of glass having different refractive indices and having coinciding concave and convex cylindrical surfaces fused into a common cylindrical section, said lens being formed with a cylindrical depression extending through one layer and into the other, intersecting the common cylindrical section in an elliptical outline, and a button of glass fused in said depression and of different index of refraction from that of the layer constituting the bottom of said depression.

3. Ophthalmic lens comprising a basic lens including two layers of glass having different refractive indices and having coinciding concave and convex cylindrical surfaces fused into a common cylindrical section, said lens being formed with a cylindrical depression extending through one layer and into the other, intersecting the common cylindrical section in an elliptical outline, and a button of glass fused in said depression, having the same refractive index as the layer penetrated by said depression, making with said layer a homogeneous lens surface.

4. Ophthalmic lens comprising a basic lens including two layers of glass having different refractive indices and having coinciding concave and convex cylindrical surfaces fused into a common cylindrical section, said lens being formed with a cylindrical depression extending through one layer and into the other, intersecting the common cylindrical section in an elliptical outline, and a button of glass fused in said depression and having a different refractive index from both of said layers, thus constituting a tri-focal lens.

5. Opthalmic lens comprising a concavo-convex basic lens including two layers of glass having different refractive indices and having coinciding concave and convex cylindrical surfaces fused into a common cylindrical section, the softer layer of glass being on the concave side of the basic lens, said basic lens being formed with a cylindrical depression extending through the softer layer into the harder layer, intersecting the common cylindrical section into an elliptical outline, and a button of glass fused in said depression.

6. Ophthalmic lens comprising a concavo-convex basic lens including two layers of glass having different refractive indices and having coinciding concave and convex cylindrical surfaces fused into a common cylindrical section, the softer layer of glass being on the concave side of the basic lens, said basic lens being formed with a cylindrical depression extending through the softer layer into the harder layer, intersecting the common cylindrical section into an elliptical outline, and a button of glass of the same refractive index as said softer layer fused in said depression making with said layer a homogeneous lens surface.

7. Ophthalmic lens comprising a concavo-convex basic lens including two layers of glass having different refractive indices and having coinciding concave and convex cylindrical surfaces fused into a common cylindrical section, the softer layer of glass being on the concave side of the basic lens, said basic lens being formed with a cylindrical depression extending through the softer layer into the harder layer, intersecting the common cylindrical section into an elliptical outline, and a button of glass fused in said depression having a different refractive index from that of both layers.

8. Opthalmic lens comprising a concavo-convex basic lens including two layers of glass having different refractive indices and having coinciding concave and convex cylindrical surfaces fused into a common cylindrical section, said basic lens being formed with a cylindrical depression intersecting the said common cylindrical section in an elliptical outline, and a button of glass fused in said depression.

9. Ophthalmic lens comprising a concavo-convex basic lens, the concave side of which is cylindrical, including two layers of glass having refractive indices and having coinciding concave and convex cylindrical surfaces fused into a common cylindrical section, said basic lens being formed with a cylindrical depression in the concave cylindrical side intersecting the said common cylindrical section in an elliptical outline, and a button of glass fused in said depression of different refractive index from that of both layers whereby a tri-focal lens is formed of which both segmental fields are elliptical.

10. Ophthalmic lens blank comprising a basic lens including two layers of glass having different refractive indices fused into a common section, said lens blank being provided with a cylindrical depression extending through one layer and into the other, forming at the intersection between the two layers an elliptical outline.

11. Ophthalmic lens comprising a concavo-convex basic lens including two layers of glass having different refractive indices and having coinciding concave and convex cylindrical surfaces fused into a common cylindrical section, said basic lens being provided with a depression of toric contour intersecting the said common cylindrical section in an elliptical outline and a button of glass fused into said depression.

OTTO G. HAUSSMANN.